United States Patent
Friesen et al.

(10) Patent No.: US 6,808,333 B2
(45) Date of Patent: Oct. 26, 2004

(54) PIVOT PIN ASSEMBLY

(75) Inventors: Dick E. Friesen, Hepburn (CA); Robin B. Schilling, Saskatchewan (CA)

(73) Assignee: CNH Canada, LTD, Racine, WI (US)

( * ) Notice: Subject to any disclaimer, the term of this patent is extended or adjusted under 35 U.S.C. 154(b) by 0 days.

(21) Appl. No.: 10/283,085

(22) Filed: Oct. 30, 2002

(65) Prior Publication Data

US 2004/0086325 A1 May 6, 2004

(51) Int. Cl.[7] .......................... E05D 11/00; E05D 11/04
(52) U.S. Cl. .................... 403/158; 403/150; 403/157; 16/273; 16/275
(58) Field of Search ............................. 403/13, 14, 26, 403/71, 150, 153, 159, 157, 158, 188, 217, 218, 231, 403, 16, 154; 411/383, 384; 74/493; 16/273, 275, 276

(56) References Cited

U.S. PATENT DOCUMENTS

| | | | | |
|---|---|---|---|---|
| 1,251,965 A | * | 1/1918 | Coatalen ...................... 74/580 |
| 1,917,431 A | * | 7/1933 | Clark ........................... 37/455 |
| 3,465,380 A | * | 9/1969 | Foltz ............................ 16/276 |
| 3,499,183 A | * | 3/1970 | Parsons ........................ 16/273 |
| 3,851,982 A | * | 12/1974 | See .............................. 403/224 |
| 4,077,655 A | * | 3/1978 | Skahill ......................... 280/756 |
| 4,096,957 A | | 6/1978 | Iverson et al. .............. 414/715 |
| 4,129,394 A | | 12/1978 | Eichinger et al. ............. 403/57 |
| 4,251,182 A | | 2/1981 | Schroeder ................... 414/723 |
| 4,398,862 A | | 8/1983 | Schroeder ................... 414/723 |
| 4,459,061 A | | 7/1984 | Klement ..................... 403/163 |
| 4,491,436 A | | 1/1985 | Easton ........................ 403/122 |
| 4,619,544 A | * | 10/1986 | Laidely ....................... 403/162 |
| 5,120,195 A | * | 6/1992 | Schmaling et al. ...... 416/134 A |
| 5,385,506 A | * | 1/1995 | Aurora ........................ 464/117 |
| 5,463,795 A | * | 11/1995 | Carlson et al. ............... 16/273 |
| 5,599,056 A | * | 2/1997 | Schmitt ...................... 296/122 |
| 5,601,377 A | * | 2/1997 | Ohya ........................... 403/58 |
| 5,735,631 A | * | 4/1998 | Patzelt et al. ............... 403/378 |
| 5,779,260 A | * | 7/1998 | Reilly et al. ........... 280/86.754 |
| 6,102,605 A | * | 8/2000 | Emmons ..................... 403/217 |
| 6,330,995 B1 | * | 12/2001 | Mangeiga et al. .......... 248/554 |

FOREIGN PATENT DOCUMENTS

| EP | 0 149 492 A2 | * | 7/1985 |
| JP | 2001-336520 | * | 12/2001 |

* cited by examiner

*Primary Examiner*—Robert J. Sandy
*Assistant Examiner*—Ruth C. Rodriguez
(74) *Attorney, Agent, or Firm*—Rebecca Henkel; Brant T. Maurer

(57) ABSTRACT

A pivot pin assembly is provided including a rotatable member having a hole therethrough with tapered ends, a pivot pin including a cylindrical portion and a conical portion engagable with a corresponding end of the tapered ends of the rotatable member, a pivot bearing engagable with the pivot pin to aid in rotation of said pivot pin; and a nut and bolt to lock said pivot pin to said rotatable member. The pivot pin is typically a conventional bearing having an inner race, an outer race, and bearings located between the inner and outer race. Optionally a washer is utilized to hold the bearings in place. In a preferred embodiment, the angle of the tapered end and the angle of the conical portion of the pivot pin are equal to each other and the angle is 20 degrees.

16 Claims, 4 Drawing Sheets

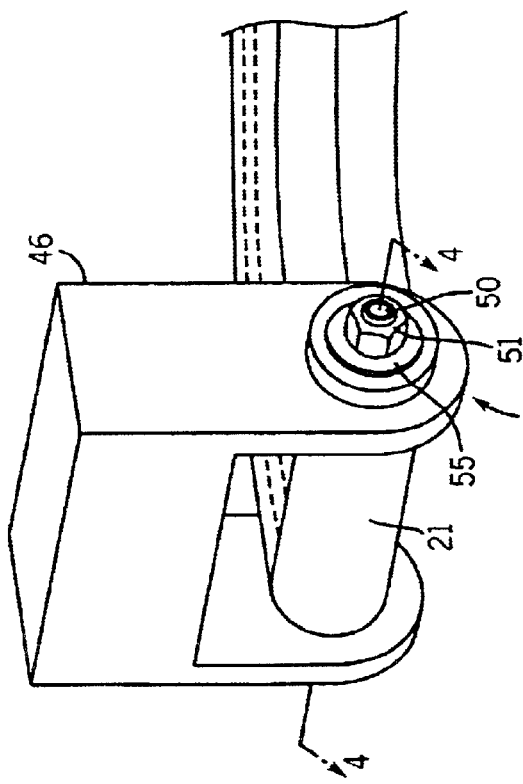
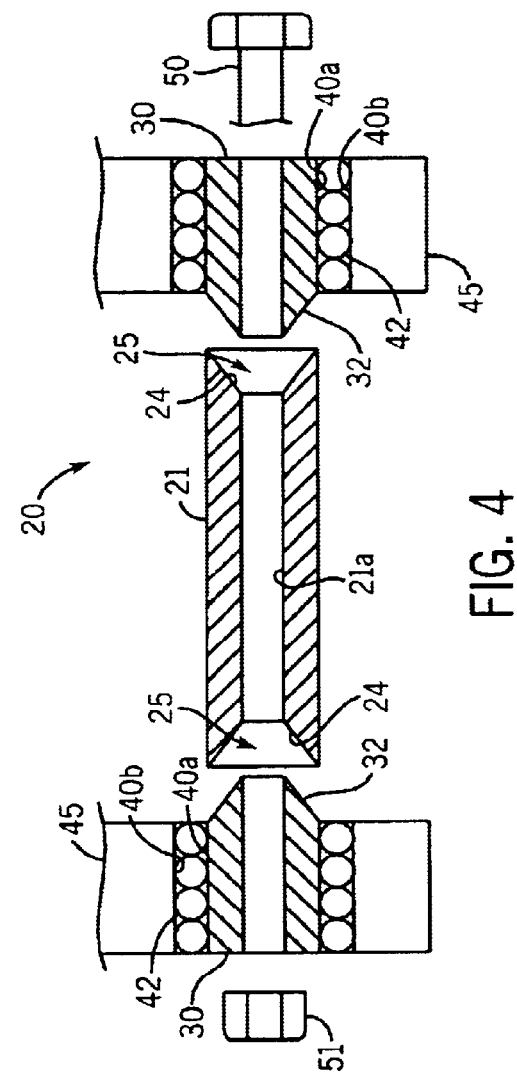

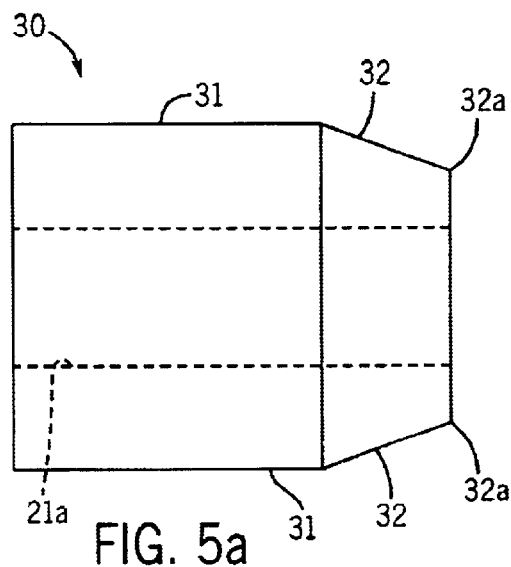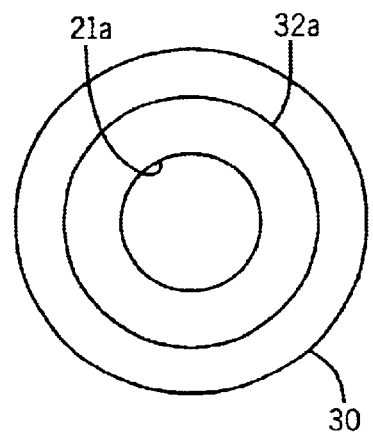
FIG. 5a    FIG. 5b
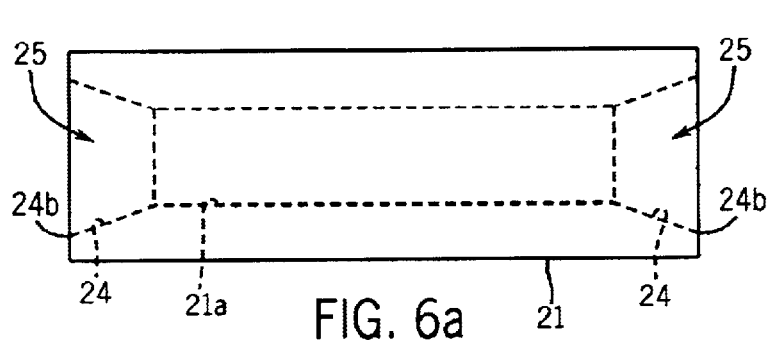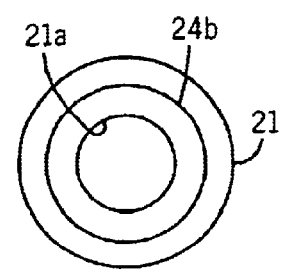
FIG. 6a    FIG. 6b

PIVOT PIN ASSEMBLY

FIELD OF THE INVENTION

The present invention relates generally to the pivotal connection of components of agricultural implements, and more particularly, to a pivot pin assembly which reduces wear and tear of the pivot pin assembly.

BACKGROUND OF THE INVENTION

It is well-known that pivot pins are commonly used to connect two members together such that one member pivots relative to another. One example of a conventional pivot pin assembly is illustrated in FIG. 1. As shown in FIG. 1, a rotatable member 10 is provided with a hole 12 along its center line. Housing members 13, each having a hole 14 therethrough, are located adjacent to the rotatable member 10 at each end. A bolt 17, inserted through holes 12 and 14, and a nut 16 tightly connects the housing members 13 and the rotatable member 10. In this example, the bolt 17 acts as a pivot pin and the rotatable member 10 rotates about bolt 17. Optionally, a bushing 19 is provided to facilitate the rotation of the rotatable member 10 about bolt 17.

When two members are pivotally related by a pivot pin secured to one of the pivotal members while the other member is rotatable about the pivot pin as illustrated in FIG. 1, high stress is placed on the pin (bolt) and pivot areas. As a result, the pivot pins, the hole through the support member, and other areas are prone to wear, causing undesirable play between the pivoting members. Additionally, a wear surface is present on the periphery of the pivot pin and support member, which necessitates a complete replacement of the pivot pin and/or pivot pin support member after a certain time period. Often the holes in the support members are located in structural components of the machine, thus making replacement both difficult and costly. Moreover, such replacement can result in extensive downtime of the implement.

Accordingly, it is desirable to provide a pivot pin assembly that overcomes the disadvantages of the known prior art.

SUMMARY OF THE INVENTION

Accordingly, an important object of the present invention is to provide a pivot pin assembly that overcomes the above-mentioned problems encountered in the prior art.

It is another object of the present invention to provide a pivot pin that has a tapered end.

It is a further object of the present invention to provide a pivot pin assembly that does not require extensive machining.

It is yet another object of the present invention to provide a pivot pin assembly that utilizes a pivot bearing to facilitate rotation of the pivot pin.

It is a feature of the present invention that the tapered end of the pivot pin inserts into the tapered end of the rotatable member.

It is another feature of the present invention that the bolt rotates with the pivot pin.

It is a further feature of the present invention that the pivot pin rotates with the rotatable member.

It is yet another feature of the present invention that two pivot pins can be utilized on the same rotatable member.

It is a further feature of the present invention that the pivot pin pivot bearing, and housing are held in place by an interference fit.

It is an advantage of the present invention that the internal tapered socket does not need extensive machining.

It is another advantage of the present invention that the pivot pin can be easily removed from the rotatable member.

It is a further object of this invention to provide a pivot pin assembly that is durable in construction, inexpensive to manufacture, carefree in maintenance, easy to assemble, and simple and effective in use.

These and other objects, features, and advantages are accomplished according to the present invention by providing a pivot pin assembly for a pivoted member having a hole therethrough of a first diameter extending from a first end to a second end, each end including a tapered opening having an internal diameter substantially equal to and in communication with the hole, the tapered opening terminating in a second diameter greater than the first diameter; a pair of pivot pins, each including a cylindrical portion supported within the support member and a conical portion engagable with a corresponding tapered opening in the pivoted member, each pivot pin having an opening therethrough having a diameter substantially equal to the first diameter and being alignable with the hole through the pivoted member; a pivot bearing engagable with the pivot pin to rotatably support the pivot pin within the support member; and a fastener passing through the opening of the pivot pins and the hole through the pivoted member to clamp the pivot pins into engagement with the pivoted member.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is perspective view of the assembled pivot pin assembly as shown in FIG. 2;

FIG. 4 is an exploded cross-sectional view of the pivot pin assembly taken along lines 4—4 of FIG. 3;

FIG. 5a is an enlarged elevational view of a pivot pin according to the present invention, the hole therethrough shown in phantom;

FIG. 5b is an end view of the pivot pin depicted in FIG. 5a;

FIG. 6a is an enlarged elevational view of a rotatable member according to the present invention, the hole therethrough shown in phantom; and FIG. 6b is an end view of the rotatable member depicted in FIG. 6a.

DETAILED DESCRIPTION OF THE PREFERRED EMBODIMENTS

Figure 1:
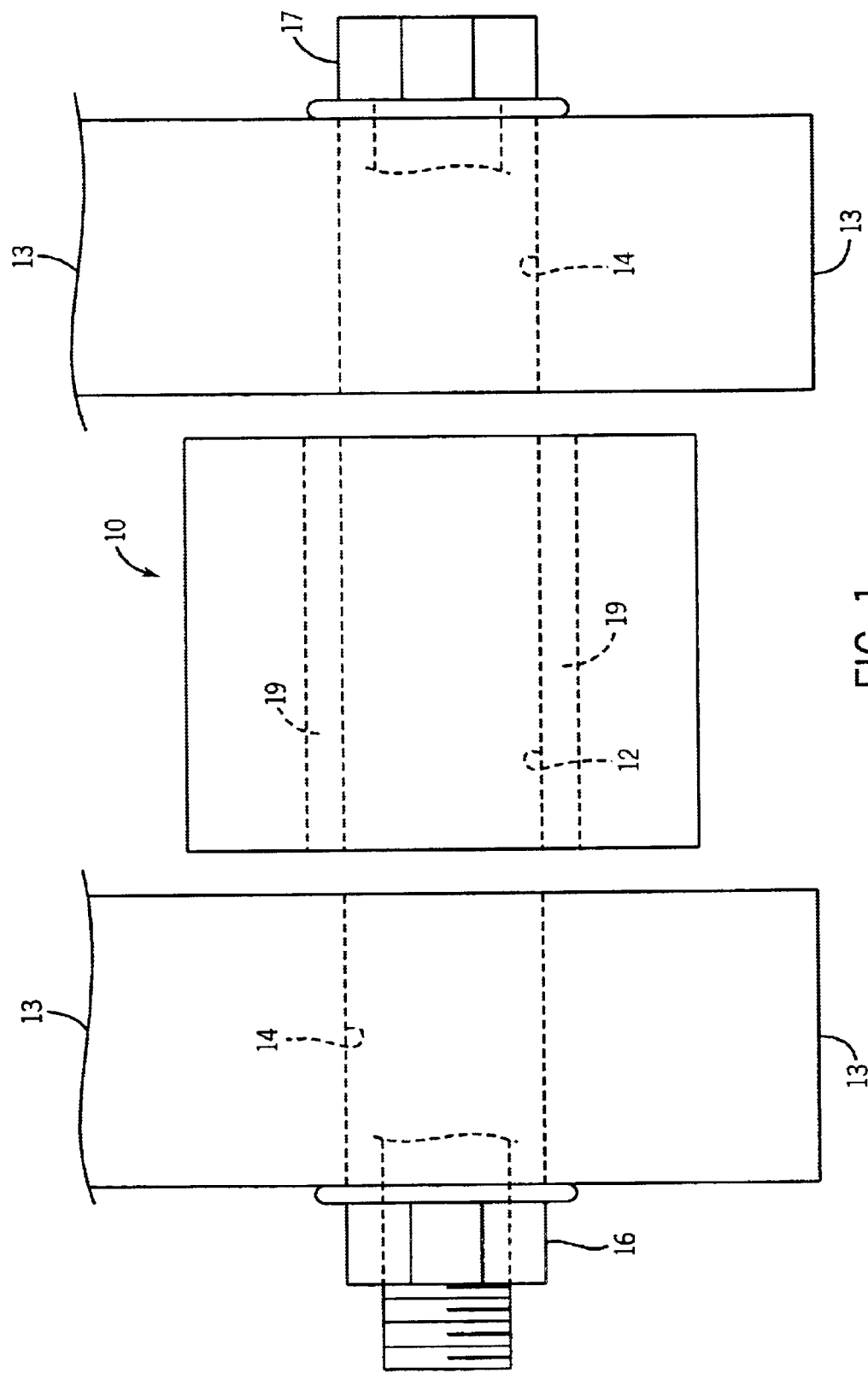
FIG. 1 is an elevational view of a known prior art pivot assembly.

Referring to FIGS. 2–6b, a pivot pin assembly incorporating the principles of the present invention can best be seen. The pivot pin assembly 20 includes a rotatable member 21 having a hole 21a therethrough with tapered ends 24 ending at point 24b. The tapered ends 24 form a conical seat 25, which is engagable with a pivot pin 30. The pivot pin 30, having a cylindrical portion 31 and a conical portion 32 ending at point 32a engagable with the corresponding tapered end 24 of the rotatable member 21, is inserted into a pivot bearing 40, which is inserted into housing 45 located in the non-rotatable support member 46. Each of these components are held together by an interference fit. The pivot bearing 40 is typically a conventional bearing having both an inner race 40a, an outer race 40b, and bearings 42 (such as roller bearings) located between the inner and outer race to permit relative movement therebetween. Alternatively, bushings can be used as the pivot bearing.

Figure 2:
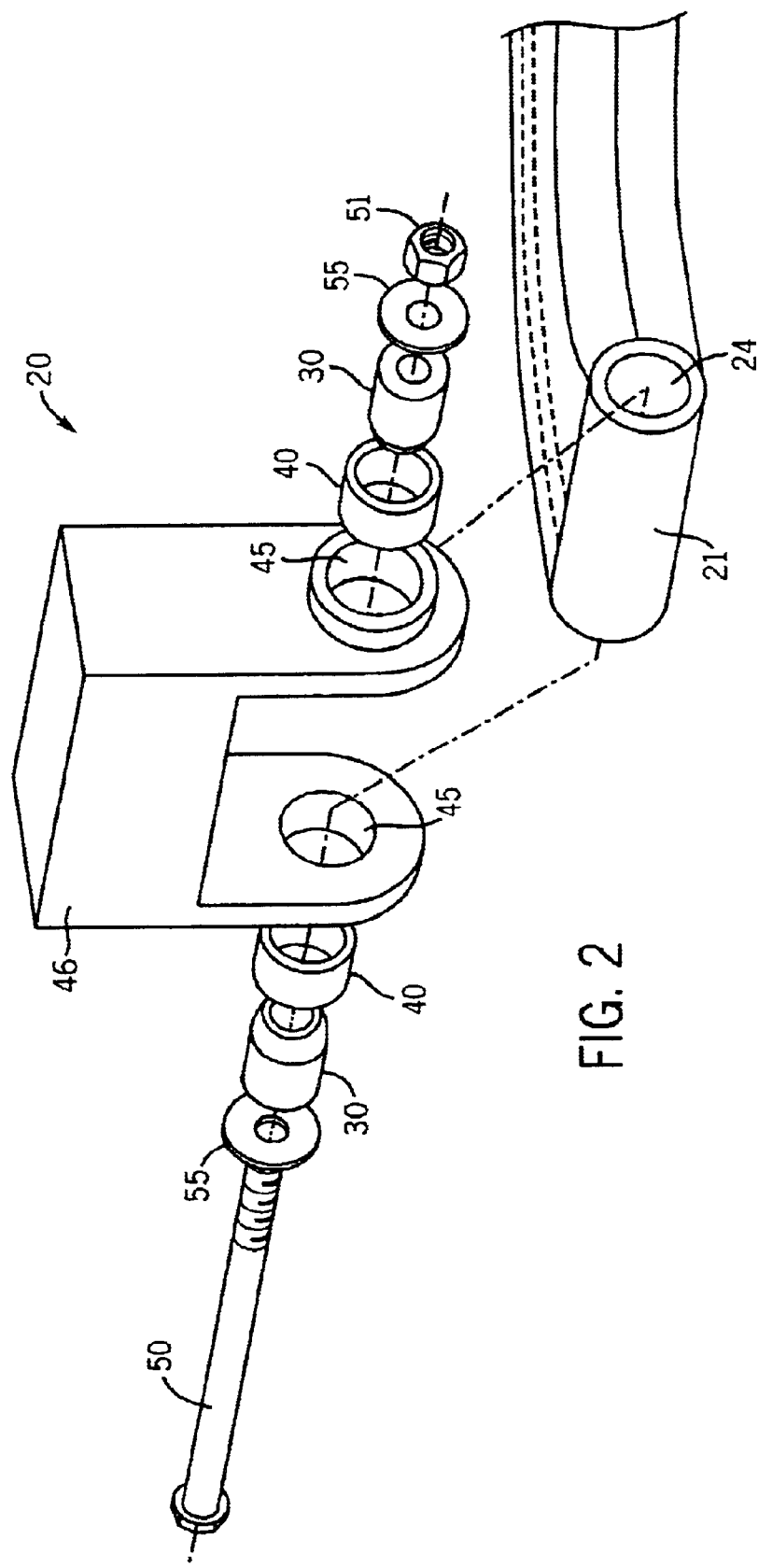
FIG. 2 is an exploded perspective view of a pivot pin assembly incorporating the principles of the present invention.

As illustrated in FIGS. 2–4, a bolt 50 is inserted into hole 21a and tightened with a nut 51 to hold the pivot assembly 20 together. Optionally, a washer 55 is utilized to retain the bearings 42 in the pivot bearing 40. By tightening the bolt 50, the pivot pin 30 is locked into the rotatable member 21. Because the pivot pin 30 is tightly affixed to the inner race 40a of the pivot bearing 40, the pivot pin and bolt 50 are rotatable with the rotatable member 21 on the same axis.

In a preferred embodiment, the angle of the tapered ends 24 and the conical portion 32 of the pivot pin 30 is between 15 and 25 degrees. In an even more preferred embodiment, the angle of the tapered ends 24 and the conical portion 32 of the pivot pin 30 is 20 degrees. As the angle of the tapered ends 24 and the conical portion 32 decreases, the pivot pin 30 is held more tightly to the tapered ends 24 of the rotatable member 21. Thus, a smaller angle prevents the easy removal of the pivot pin for maintenance or replacement.

Of the many implicit and explicit advantages of the present invention, one of the most important is the easy assemblage and production of the pivot pin assembly 20. Unlike prior art pivot assemblies, the hole 21a through the rotatable member arm 21 and the pivot pin 30 does not require extensive machining. Since the pivot pin 30 rotates with the inner race 40a against the bearings 42, and not against a rigid bushing, there is no need to accurately machine and polish the hole 21a as in the prior art pivot pin assemblies. Moreover, the pivot pin assembly 20 is easily assembled by placing the individual components in their proper location and bolting them together.

In addition, because the conical portion 32 of the pivot pin 30 reaches into the tapered ends of the rotatable member 21, the pivot pin assembly 20 is able to carry a significant load. Since this load is distributed throughout the rotatable member 21 and the pivot pins 30, load limitations inherent with pivot bolts, as is shown in FIG. 1, are avoided. Furthermore, both the pivot pins 30 and the rotatable member 21 can be formed as castings which will have greater load bearing properties than a bolt.

Furthermore, the pivot pin assembly 20 provides cost savings due to the length and amount of material used in the pivot pins 30. Typically, pivot pins are heat treated or chrome plated to resist wear. Because it is difficult, or even impossible, to heat treat or chrome plate only the high stress areas of the pivot pin, the entire pivot pin is either treated or plated. However, the pivot pins 30 of the present invention are of a shorter length than conventional pivot pins. As a result, less of the expensive materials used to treat and plate the pivot pin 30 is used, thereby resulting in a reduction in cost.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A pivot pin assembly for a pivoted member from a fixed support member comprising:

said pivoted member having a hole therethrough of a first diameter extending from a first end to a second end, each said end including a tapered opening having an internal diameter substantially equal to and in communication with said hole, each said tapered opening terminating in a second diameter greater than said first diameter;

a pair of pivot pins, each including a cylindrical portion supported within said support member and a conical portion engagable with a corresponding one of said tapered opening in said pivoted member, each said pivot pin having an opening therethrough having a diameter substantially equal to said first diameter and being alignable with said hole through said pivoted member;

a pivot bearing engagable with each said pivot pin to rotatably support said pivot pin within said support member; and a fastener passing through the opening of said pivot pins and the hole through said pivoted member to clamp said pivot pins into engagement with said pivoted member.

2. The pivot pin assembly of claim 1, wherein said pivot bearing includes an inner race, an outer race, and rotatable bearing members located between said inner and outer race.

3. The pivot pin assembly of claim 2, wherein said fastener includes washers to hold said pivot bearings in place.

4. The pivot pin assembly of claim 1, further comprising a housing member located on a non-movable member engagable with said pivot bearing.

5. The pivot pin assembly of claim 4, wherein said housing member, said pivot bearing, and said pivot pin are held together by an interference fit.

6. The pivot pin assembly of claim 1, wherein the angle of said tapered ends of said rotatable member are equal to the angle of said conical portion of said pivot pin.

7. The pivot pin assembly of claim 6, wherein said angle is 20 degrees.

8. The pivot pin assembly of claim 1, wherein each pivot bearing includes an inner race, an outer race, and rotatable bearing members located between said inner and outer race, and each pivot pin contacts the inner race of its corresponding pivot bearing.

9. In a pivotal connection of a pivoted member supported from a fixed support having a pair of spaced support arms between which said pivoted member is to be pivotally supported, said pivotal connection including a fastener extending through holes in said support arms and said pivoted member to positionally fix said pivoted member to said support arms, the improvement comprising:

a pair of pivot pins mounted in said support arms, respectively, for rotational movement by respective pivot bearings, each pivot bearing being engagable with each said pivot pin to rotatably support said respective pivot pin within said support arms, each said pivot pin including an inwardly directed conical portion projecting from said support arm toward the opposing support arm; and said pivoted member being formed with a conical seat concentric with said hole through said pivoted member on each opposing end of said pivoted member, said conical portions of said pivot pins being received within the corresponding conical seat so that said pivoted member is rotatably supported on said pivot pins to permit pivotal movement of said pivoted member relative to said fixed support, said fastener clamping said pivot pins and said pivoted member together.

10. The pivotal connection of claim 9, wherein the corresponding said pivot pin, said bearing, and said support arm are held together by an interference fit.

11. The pivotal connection of claim 10, wherein said fastener, said pivot pins, and said pivoted member rotate together on an axis defined by said fastener.

12. The pivotal connection of claim 11, wherein both said conical seats of said pivoted member and said conical portion of said pivoted member slope at equal angles.

13. The pivotal connection of claim 12, wherein said angle is approximately 20 degrees.

14. The pivotal connection of claim 9, wherein each pivot bearing includes an inner race, an outer race, and rotatable bearing members located between said inner and outer race, and each pivot pin contacts the inner race of its corresponding pivot bearing.

15. A pivot pin assembly for a pivoted member from a fixed support member comprising:

said pivoted member having a hole therethrough of a first diameter extending from a first end to a second end, each said end including a tapered opening having an internal diameter substantially equal to and in communication with said hole, each said tapered opening terminating in a second diameter greater than said first diameter;

a pair of pivot pins, each including a cylindrical portion supported within said support member and a conical portion engagable with a corresponding one of said tapered opening in said pivoted member, each said pivot pin having an opening therethrough having a diameter substantially equal to said first diameter and being alignable with said hole through said pivoted member;

a pivot bearing engagable with each said pivot pin to rotatably support said pivot pin within said support member; and a fastener passing through the opening of said pivot pins and the hole through said pivoted member to clamp said pivot pins into engagement with said pivoted member, wherein the angle of said tapered ends of said rotatable member are equal to the angle of said conical portion of said pivot pin and said angle is 20 degrees.

16. In a pivotal connection of a pivoted member supported from a fixed support having a pair of spaced support arms between which said pivoted member is to be pivotally supported, said pivotal connection including a fastener extending through holes in said support arms and said pivoted member to positionally fix said pivoted member to said support arms, the improvement comprising:

a pair of pivot pins mounted in said support arms, respectively, for rotational movement by respective bearings, each said pivot pin including an inwardly directed conical portion projecting from said support arm toward the opposing support arm; and said pivoted member being formed with a conical seat concentric with said hole through said pivoted member on each opposing end of said pivoted member, said conical portions of said pivot pins being received within the corresponding conical seat so that said pivoted member is rotatably supported on said pivot pins to permit pivotal movement of said pivoted member relative to said fixed support, said fastener clamping said pivot pins and said pivoted member together, wherein the corresponding said pivot pin, said bearing, and said support arm are held together by an interference fit, wherein said fastener, said pivot pins, and said pivoted member rotate together on an axis defined by said fastener, wherein both said conical seats of said pivoted member and said conical portion of said pivoted member slope at equal angles, and wherein said angle is approximately 20 degrees.

* * * * *